United States Patent [19]

Maldavs

[11] 4,383,549

[45] May 17, 1983

[54] ADJUSTABLE VELOCITY FUSE FOR HYDRAULIC LINE

[75] Inventor: Ojars Maldavs, Lincoln, Nebr.

[73] Assignee: Imperial Clevite Inc., Rolling Meadows, Ill.

[21] Appl. No.: 256,379

[22] Filed: Apr. 22, 1981

[51] Int. Cl.³ .............................................. F16K 17/34
[52] U.S. Cl. .................... 137/514.7; 137/498; 137/517
[58] Field of Search ............ 137/460, 498, 514.7, 137/517

[56] References Cited

U.S. PATENT DOCUMENTS 1,652,038 12/1927 Meyer ................................. 137/517
2,917,077 12/1959 Ziege ............................. 137/517 X
3,234,961 2/1966 Arnes .................................. 137/517

FOREIGN PATENT DOCUMENTS 2324710 12/1974 Fed. Rep. of Germany ...... 137/460
2343645 3/1975 Fed. Rep. of Germany ...... 137/498
140689 4/1920 United Kingdom ................ 137/517

Primary Examiner—Robert G. Nilson
Attorney, Agent, or Firm—Russell E. Baumann

[57] ABSTRACT

An adjustable velocity fuse for a hydraulic line including a poppet valve assembly having a shielded head so as to be responsive to changes in fluid pressure differential and having an external adjustment associated therewith.

9 Claims, 3 Drawing Figures

ADJUSTABLE VELOCITY FUSE FOR HYDRAULIC LINE

BACKGROUND AND SUMMARY OF INVENTION

This invention relates to an adjustable velocity fuse for a hydraulic line and, more particularly, to a fuse that can be adjusted while the hydraulic line is operational and without disturbing the hydraulic circuit.

Velocity fuses which are also known as excess flow protectors, safety valves and hydraulic circuit breakers, have been used for years to close or block flow in hydraulic lines if excess flow occurs. This may happen when a hose ruptures or when there is a free flow condition in the hydraulic circuit.

On most current fuses, the fuse point or shutoff flow rate is established by an orifice within the fuse. Changing the orifice size changes the fuse point flow rate. The orifice is drilled to the correct size by the manufacturer. To change the orifice size and thereby the fuse point, the valve must be disassembled and the orifice size changed.

On many machines which use a fuse in a hydraulic circuit, it is desirable to adjust the fuse point to match the machine characteristics and/or the operating conditions. This is difficult and impractical with current fuses because it would require a disassembly of the fuse, re-drilling or replacing the orifice and reassembly each time an adjustment is needed.

A second problem with current fuses is premature closing or fusing. "Short duration" surges of flow in a hydraulic circuit are common. It is desirable for the fuse to permit "short duration" surges, but fuse if the surge persists.

A third problem with current fuses is the variation in fusing point as the fluid viscosity changes. Changes in fluid temperature change the fluid viscosity and likewise the fuse point of the fuse. For example, a manufacturer may set the fuse point at a fluid temperature of 100° F. The machine operator may start the machine at minus 20° F. As the machine warms up, it may operate at 200° F. The fuse point could be grossly different at each of the three temperatures.

The invention provides a solution to the foregoing problems through the provision of an adjustable poppet valve assembly resiliently urged away from a fixed seat. A guide is provided which effectively masks all of the assembly except for the poppet valve head whereby the inventive fuse is sensitive to pressure differentials across the poppet valve head and seat to overcome the resilient bias. By the same token, however, the limited amount of surface area of the moving parts minimizes the fuse's sensitivity to changes in fluid viscosity. The fuse is further equipped with a dash pot chamber to prevent premature closing as on short duration surges. Further, and most importantly, an external adjustment is provided to change the position of the poppet valve assembly while the fluid is flowing through the fuse and without disturbing the hydraulic system.

Other advantages and objects of the invention may be seen in the details of the ensuing specification.

DETAILED DESCRIPTION

Figure 1:
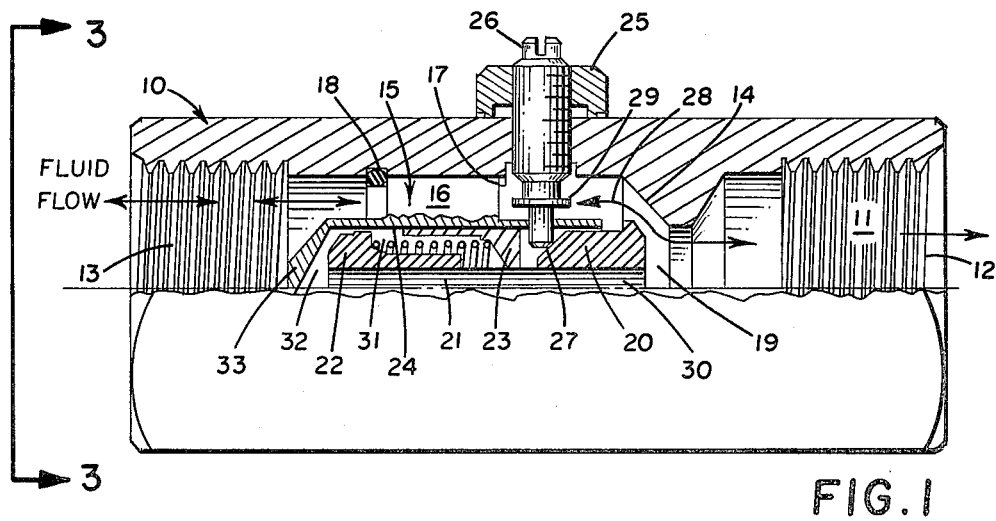
Figure 2:
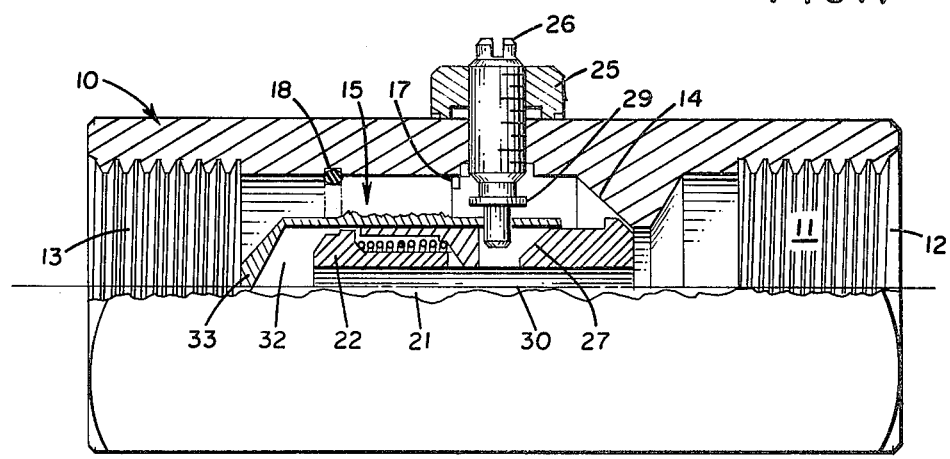
Figure 3:
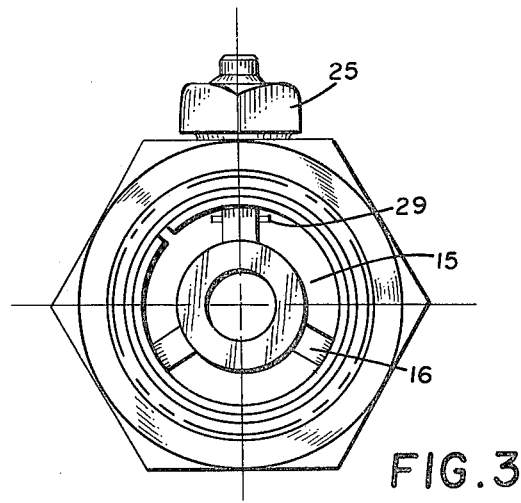

The invention is explained in conjunction with an illustrative embodiment in the accompanying drawing, in which FIG. 1 is an elevational view, partially in section, of the inventive fuse;

FIG. 2 is a view similar to FIG. 1 but showing the fuse in closed condition; and FIG. 3 is an end elevational view such as would be seen along the sight line 3—3 applied to FIG. 1.

In the illustration given and with reference first to FIG. 1, the numeral 10 designates generally a tubular body adapted to be interposed in a hydraulic circuit. The body 10 provides a through passage 11 having a first end 12 and a second end 13. In the condition of the fuse seen in FIG. 1, flow can occur in either direction.

Provided by the body 10 and extending radially inwardly of the passage 11 is an integral valve seat 14 positioned somewhat adjacent the first passage end 12.

Provided within the passage 11 and somewhat adjacent the second passage end 13 is a guide generally designated 15. As can be appreciated from a consideration of FIG. 3, the guide 15 is generally tubular and is equipped with a plurality of radially extending ribs 16, one of which can be seen in FIG. 1. The ribs 16 at the ends thereof adjacent the passage first end 12 abut a radial constriction 17 within the passage 11 and are fixed within the passage 11 by the provision of a lock ring 18.

Slidably mounted for axial movement within the guide 15 is a poppet valve assembly generally designated 19. The assembly 19 includes a valve head 20 which is adapted to coact with the seat 14 in closing off the flow passage 11. Additionally, the assembly 19 is equipped with a radially constricted portion 21 spaced toward the passage second end 13 from the head 20 and further a second radial enlargement 22 which is adjacent the passage second end 13. The guide 15, intermediate the ends thereof, is equipped with the spring stop 23 which is aligned with the radially constricted portion 21. Interposed between the second enlargement 22 and the spring stop 23 is a compression spring 24. Thus, as fluid pressure acts on the head 20, the assembly 19 is moved to the right against the resilient urging of the spring 24.

FUSE ADJUSTMENT

Adjustment of the fuse set point is made by loosening the lock-seal nut 25 and moving the adjusting screw 26 up or down to the preferred position. As the screw 26 moves down to the position shown in FIG. 1 and against a ramp 27 provided at the end of the head enlargement adjacent the passage other end 13, it moves the poppet assembly 19 to the right, i.e., towards the seat 14. This results in a reduction of the flow passage 28 and creates an increasing flow restriction therein and thereby increasing hydraulic pressure differential across the head 20 of the poppet assebmly 19. This pressure differential creates a force against the poppet head 20, tending to shift it to the right toward the seat 14.

As the flow rate increases, the differential pressure increases. When the differential pressure reaches the point where the force on the poppet head 20 exceeds the counteracting force of the spring 24, the poppet will shift to the right, stop on seat 14 and stop fluid flow.

FIG. 2 illustrates the fuse in the closed or fused condition. The poppet head 20 is against the seat 14, stopping any fluid flow from left to right. As soon as the pressure is released by the operator, the spring 24 shifts the poppet back to the open position shown in FIG. 1. The fuse thus is automatically reset. Thus, the coaction of the guide 15, poppet assembly 19 and adjusting means including the screw 26 and ramp 27 constitute an external adjustment to change the fuse point setting-and further an external adjustment that can be changed while fluid is flowing through the fuse and without disturbing the hydraulic system.

It will also be noted that virtually all of the poppet assembly 19 is shielded by the fixed guide 15 except the actual head 20 of the poppet. Thus, only the poppet head senses the flow rate and reacts accordingly. Minimizing the amount of surface area of the moving parts of the poppet assembly 19 minimizes the sensitivity of the fuse to changes in fluid viscosity.

I also provide a protective means in the form of an annular shoulder 29 on the screw 26 to prevent the operator from removing the screw 26 from its threaded seating within the body 10.

In the illustration given, the poppet assembly 19 includes a rod 30. The two enlargements 20 and 22 are press-fitted on the rod and are axially spaced apart in the positions shown-thereby providing the radial constriction 21. Other retaining methods such as threads, lock rings, etc. could be used to retain the three parts as an assembly. The spring stop 23 is also press-fitted in the bore of the guide 15 and effects a sliding fit over the rod 30, viz., in the constricted portion 21 of the poppet assembly 19.

SHORT DURATION SURGE PROTECTION

Protection against the fusing of the system, i.e., closing of the poppet valve, upon the occurrence of a short duration surge, is achieved through the co-operation of the poppet assembly 19 and the guide 15. Provided between the spring stop 23 and the second enlargement 22 is a cavity 31 which, in part, houses the spring 24. A second cavity 32 is provided between the closed end 33 of the guide 15 and the second enlargement 22. These cavities 31 and 32 are full of oil in the normal operation. As the poppet assembly 19 moves to the right toward the seat 14, oil from the cavity 31 is squeezed through the small clearance between the outside diameter of the second enlargement 22 and the bore of the guide 15 into the cavity 32. This small clearance is a restriction and thus restricts quick movement of the poppet assembly and prevents the poppet from closing prematurely due to "short duration" flow surges. This then provides a dashpot chamber operation to prevent the premature fusing.

While in the foregoing specification, a detailed description of an embodiment of the invention has been set down for the purpose of illustration, many variations may be made in the details hereingiven without departing from the spirit and scope of the invention.

I claim:

1. An adjustable velocity fuse for a hydraulic line comprising a tubular body providing an internal valve seat, a guide fixed in said body axially spaced from said seat, a poppet assembly axially slideably mounted in said guide and including a poppet head engageable with said seat, a spring operably associated with said guide and poppet assembly for resiliently biasing said poppet head away from said seat, and an externally adjustable adjusting screw in said body for urging said poppet head toward and away from said seat for determining the spacing between said poppet head and seat while still providing for said poppet head to be engageable with said seat, said adjusting screw having a portion located outside of the flow stream in said hydraulic line.

2. The structure of claim 1 in which said guide includes a tubular member having a closed end remote from said seat, said poppet head being radially enlarged relative to the bore of said guide to sense changes in hydraulic fluid flow rate and react to pressure differentials there-across and thereby overcome the biasing of said spring to engage said seat.

3. The structure of claim 2 in which the portion of said poppet head remote from said seat is equipped with a ramp for selective engagement with said adjusting screw.

4. The structure of claim 3 in which said adjusting screw is equipped with an integral shoulder to prevent inadvertant removal of said screw from said body.

5. The structure of claim 2 in which said guide and poppet assembly cooperate to form a dashpot chamber to prevent premature engagement of said poppet head with said seat.

6. The structure of claim 5 in which said dashpot chamber includes a cavity between said guide and poppet assembly and a constricted bore there-between whereby movement of said poppet assembly toward said seat is limited by the rate of flow of hydraulic fluid from said cavity through said constricted bore.

7. An adjustable velocity fuse for a hydraulic line comprising a tubular body adapted to be interposed in said line and providing an axially-extending passage therethrough, said passage being radially constricted adjacent one end thereof to provide a valve seat, a guide fixed in said passage adjacent the other end thereof, a poppet valve assembly slidably mounted in said guide for axial movement toward and away from said seat and equipped with a head for coaction with said seat, said assembly being resiliently biased away from said seat by a biasing means, an external adjustment means operably associated with said body for varying the resilient bias of said biasing means on said assembly and urging said poppet head toward and away from said while still providing for said poppet head to be engageable with said seat, said external adjustment means having a portion located outside of the flow stream in said hydraulic line for allowing adjustment while installed in the hydraulic line, said guide when fluid is flowing from said other end toward said one end masking all of said assembly except said head whereby changes in fluid flow changes the pressure differential functionally only across said head and seat and thereby minimize the sensitivity of said fuse to viscosity changes.

8. The structure of claim 7 in which said guide is a tubular member closed at the end thereof adjacent the passage other end, said tubular member guide having a spring stop fixed therein intermediate the ends thereof, said poppet assembly having a radially constricted portion intermediate the ends thereof in sliding relation with said spring stop and a radial enlargement adjacent the passage other end, said enlargement and said spring stop being axially spaced to provide a spring cavity, a spring in said cavity, said enlargement with said guide providing a constricted annular passage for exhaust of fluid from said cavity upon compression of said spring whereby said fuse is relatively insensitive to short duration flow surges.

9. The structure of claim 8 in which said assembly is equipped with a second radial enlargement, said second enlargement being adjacent said passage first end, said second enlargement having a ramp face spaced from said head for coaction with said adjustment means.

* * * * *